United States Patent Office 2,928,759
Patented Mar. 15, 1960

2,928,759

ISOOLEFIN-VINYL AROMATIC COPOLYMER LATEX CONTAINING AN ORGANIC ANIONIC SULFATE AND A SALT OF A DIHYDROGEN ORTHO-PHOSPHATE

Raymond G. Newberg, Watchung, Alfred L. Miller, Cranford, and William John Gilbert McCulloch, Plainfield, N.J., assignors to Esso Research and Engineering Company, a corporation of Delaware No Drawing. Application February 27, 1957
Serial No. 642,663

18 Claims. (Cl. 117—113)

This invention relates to novel latices of an isoolefin-vinyl cyclic compound copolymer, their preparation and application to a fibrous substance, such as paper, as well as the treated fibrous substances themselves.

The preparation of copolymers composed of isoolefins and vinyl cyclic compounds is well known in the art. Essentially the method consists in carrying out the copolymerization in the presence of a Friedel-Crafts catalyst at a temperature below 0° C. such as —10° C., —50° C. or as low as —100° C. While the most frequently used and preferred monomers are isobutylene and styrene, other isoolefins, such as methyl-2, butene and isoamylene, and cyclic compounds such as alpha methyl styrene, para methyl styrene, vinyl naphthalene, indene, etc. may be used, as disclosed in U.S. Patent 2,274,749. Upon completion of the copolymerization, residual catalyst is removed by washing the product with water and preferably also with a dilute water solution of base, such as sodium hydroxide. The resulting solid copolymer may range from a relatively stiff plastic mass to a resinous solid, depending upon the temperature of polymerization and the proportion of cyclic reactant in the feed. The molecular weight (Staudinger) of the product will generally range from about 800 upwards, as for instance, to 40,000 or 100,000 or more and the intrinsic viscosity from 0.1 to 3.0 or more, but preferably above 0.6.

While in the past, it has proved difficult to make stable latices of this type of copolymer, it has now been found that a stable latex may be prepared by using an anionic sulfate, containing at least 1 ethylene oxide unit, as the emulsifier and a small quantity of a monovalent salt of an orthophosphate as a stabilizer. It has furthermore been found that when this latex is applied to a fibrous substance, such as paper, it forms a film which acts as a moisture barrier. Thus, it may be used to coat the inner and/or the outer surface of drinking cups, milk cartons, etc.

The copolymerization is effected by mixing the two reactants, with or without a mutual solvent, such as ethylene, propane, butane, methyl chloride or refined naphtha, and then after the cooling of the reactants to the desired low temperature below 0° F., adding a Friedel-Crafts halide catalyst such as boron fluoride, aluminum chloride, titanium tetrachloride or aluminum alkoxide-aluminum chloride complex (AlCl$_3$.Al(OC$_2$H$_5$)$_3$). If desired, such catalyst may be dissolved in a solvent such as carbon disulfide, a low molecular weight sulfur-free saturated hydrocarbon, a lower alkyl halide, e.g. methyl chloride, or ethyl chloride or a mixture of methyl chloride with butane at or below the boiling point of the catalyst solvent, and then the catalyst solution cooled down, filtered and added to the reaction mixture. Volatile solvents or diluents, e.g. propane, ethane, ethylene, methyl chloride, alkyl halides, methylene chloride or carbon dioxide (liquid or solid) may also serve as internal or external refrigerants to carry off the liberated heat of polymerization. After completion of the copolymerization, residual catalyst is hydrolysed with alcohol, for example, isopropyl, and excess catalyst is removed by washing the product with water and preferably also with dilute aqueous caustic soda.

The preferred operating conditions for making the copolymers comprise copolymerizing a reaction mixture containing 20–60% of styrene and the balance isobutylene, at a temperature below —50° C. in the presence of about 1 to 4 volumes of methyl chloride or other lower alkyl halides per volume of active polymerization feed, and using as the catalyst the solution of aluminum chloride dissolved in methyl chloride or other lower alkyl halide. The polymer dissolves in the cold reaction diluent and is discharged into a well agitated body of a heated liquid medium, such as water, in which the polymer is insoluble and which is maintained at a temperature well above the boiling point of the volatile materials accompanying the polymer, to form a slurry of finely divided polymer particles in the water and to flash off the reaction mixture. This slurry is then stripped of any residual volatile materials and dried while being carried through a tunnel on a screen or on sections of a perforated plate in the presence of warm air.

According to the present invention the copolymer is dissolved in an inert C$_6$ to C$_{12}$ hydrocarbon solvent, such as hexane, heptane, benzene and the like at room temperature or a slightly elevated temperature, e.g. 70° C., to make about a 10 to 40 weight percent solution. For most purposes, a concentration in the range of about 20 to 25 weight percent is suitable. 100 parts by weight of the dissolved copolymer is then dispersed with from about 50 to 600 parts by weight of an aqueous solution containing from about 1 to 20 parts by weight of an emulsifier having the general formula:

$$R(OCH_2CH_2)_nOSO_3X$$

wherein R is aliphatic, aryl, or aralkyl, having 12 to 16 carbon atoms, n is 1 to 9 and X is a monovalent metal or radical, such as an alkali metal, amine or ammonium. In addition to the emulsifier, the aqueous solution should also contain between about 0.25 and 2 parts by weight of a monovalent salt, e.g. alkali metal, amine or ammonium, of an orthophosphate. The preferred orthophosphate salt is alkali metal salt of dihydrogen orthophosphate. To emulsify the hydrocarbon-aqueous system, mechanical work is preferably supplied to break down the hexane solution into particles, colloidal in size, e.g. 0.1 to 3 microns. This mechanical action is aided to a considerable extent by the character of the emulsifier system in terms of its efficiency in reducing the surface tension between the oil and water phases and its ability to protect the newly formed colloidal particles from agglomeration to the other particles. Machines commonly used to supply this mechanical action include high speed stirrers such as a Dispersator, high shear producing machines such as colloid mills and high pressure homogenizers and shear production by sound energy such as the Rapisonic or Minisonic Homogenizers.

The emulsifiers which may be used in accordance with the present invention are organic anionic sulfates containing at least 1 and up to 9 ethylene oxide units. The following is a list of sulfates suitable for the purposes of this invention: Sodium polyoxyethylene nonyl phenol sulfate, sodium polyoxyethylene tridecyl sulfate, sodium polyoxyethylene lauryl sulfate, ammonium polyoxyethylene nonylphenol sulfate, and ammonium polyoxyethylene tridecyl sulfate. However, it is preferred to use 3.5 to 7 php. (parts by weight per 100 parts by weight of polymer) of an emulsifier having 4 to 9 ethylene oxide units. The addition of small quantities of an orthophosphate salt, that is, about 0.25 to about 2 php. improves the stability of the latex emulsion, particularly the processing stability. The effect of the stabilizing agent is not merely additive, since when used alone, it will not produce a stable emulsion. The stabilizer, which is a dihydrogen orthophosphate in its preferred form, is especially effective when employed in an amount between about 1 to 1.5 php.

In one embodiment of this invention the emulsion is prepared in a Minisonic Homogenizer having a funnel, gear pump, bell, recycle line, cement injection line and a mixer. The funnel is charged with water containing the emulsifier or emulsifier-stabilizer mixture. The aqueous solution is recycled by means of a gear pump for about 1 minute. During this operation, the liquid is pumped through an orifice and sprayed over a reed in the bell. It returns to the funnel by means of a recycle line. After about 1 minute of recycling, the cement, which is generally a hydrocarbon solution containing about 20 to 25% by weight of styrene-isobutylene copolymer is introduced to the homogenizer through a line which terminates just above the gears of the pump. The coarse emulsion formed in the pump is sprayed through an orifice and converted to a fine emulsion by the sonic cavitation produced by the reed in the bell of the homogenizer. The emulsion is recycled for about 6 to 30 minutes, generally about 12 minutes, before it is withdrawn from the homogenizer and stripped of the hydrocarbon solvent.

The stripping operation may be carried out at elevated temperatures, e.g. 65 to 100° C., and atmospheric pressures until no more solvent can be removed. If a high solids latex is desired, a portion of the water may be stripped off either at atmospheric or sub-atmospheric pressure. Because foaming may occur during this step in a process, the latex is sometimes diluted with stripped or partly stripped latex, and/or an antifoaming agent, such as a poly-silicone oil, can be added just prior to the stripping step.

The amount of water contained in the emulsion is not critical as long as there is enough water present to produce a stable emulsion. The water may be increased at the time of application by adding whatever water is needed to provide a good working consistency. Although the latices may vary in solids content between about 20 and 70 weight percent, it is preferred to concentrate or strip the latex to contain at least 50 weight percent total solids.

For some purposes, such as in the manufacture of milk cartons, it is advantageous to use a mixture of copolymer and wax. The wax may be selected from a wide variety of available natural and synthetic aliphatic wax, of which one of the most readily available and very suitable ones is a paraffin wax which may have a melting point between the approximate limits of 40° C. to 90° C. or higher, those having a melting point between about 50° C. and about 65° C. being commonly available commercially. Instead of using a paraffin wax which is a crystalline, one may use amorphous wax, such as petrolatum or deoiled petrolatum often referred to as microcrystalline wax, or mixtures of crystalline and amorphous waxes. One may also use other essentially aliphatic waves which may contain a small amount of oxygen which may be present in the form of an ester, carboxyl, hydroxyl, etc. groups, such as in the case of carnauba wax, and hydrogenated castor oil, etc. The above types of wax, or mixtures thereof, e.g. a mixture of paraffin wax and petrolatum or paraffin wax and carnauba wax, may be used either in a relatively highly refined state such as after having been sweated or recrystallized one or more times or after subjection to acid treatment, clay treatment etc., or they may be used in a crude form, providing the small proportions of impurities present are not harmful for the purposes for which the finished composition is intended to be used.

The proportions in which the two primary constituents of this invention, namely, the wax and the copolymer are to be used, will of course vary to a certain extent depending upon the intrinsic viscosity of the latter, as well as upon the other physical characteristics of these two constituents, and also upon the intended use of the compositions, but normally will range from about 5 to 100 parts by weight, and preferably about 15 to 50 parts per 100 parts by weight of copolymer.

It should also be understood that minor amounts of other additives may be used as for instance 0.1% to 5% of a plasticizer; but, of course, any toxic substance, e.g. zinc stearate, should not be used for food containers but may be used to treat paper used for other purposes. Other additives which may or may not be used include such things as dyes, pigments, antioxidants, e.g. barium diisobutyl phenol sulfide, and fillers.

Although various methods may be used to compound the wax and polymer, the preferred method is to dissolve the two substances in a mutual solvent, such as a $C_6$ to $C_{12}$ liquid hydrocarbon and disperse them with the aqueous solution in the same manner described above.

In one embodiment of the invention the latex is used to coat a fibrous substance such as cardboard, paper, cloth, etc. to protect it from action of moisture in the atmosphere and to serve as a moisture wrapper or packaging material. This embodiment is particularly applicable to cartons and cups used to hold various beverages such as milk, soda water and fruit juices. By applying the copolymer in a latex form to the fiber it is possible to produce a very suitable coating without using the more expensive machinery needed for extrusion coating. The coating may be applied by roll-coating on one or both sides, or by dipping the fiber into the latex and drying in an oven at between about 60 and 90° C. for from between about 5 and 60 minutes. If desired, the depth of the coating may be adjusted with a doctor knife or by passing it through two rollers. Other methods of application include brushing or spraying the latex onto the fibrous support. It is not necessary to coat both sides of the fiber with the latex, but rather only one side may be coated or, if desired, the other side may be coated with polyethylene or wax. While the coating may have a thickness between about 0.5 and 2.0 mils, it should be borne in mind that generally it is preferred to apply a thicker coating, e.g. 1.5 mils, on the inside surface of the carton than on the outside surface, e.g. 0.5 mil.

Other than the economic advantage, the benefits derived by using these latices to coat fibrous materials include the non-cracking properties of wax, a high blocking temperature, e.g. about 60° C., good heat sealing properties and a low moisture transmission. A very important advantage of these latices is that they are nonflammable and therefore may be freely handled in all areas.

The following examples illustrate how the invention may be practiced.

Example 1

A copolymer composed of about 50% styrene and 50% isobutylene having a Staudinger molecular weight of about 60,000 was dissolved in benzene at room temperature to make a 20 wt. percent solution. 1500 grams of the copolymer solution was then dispersed in a colloid mill for 5 minutes with 710 cc. of an aqueous solution containing 1 part by weight of sodium dihydrogen orthophosphate and 5 parts by weight of the sodium salt of a sulfated polyethyleneoxide adduct of nonylphenol having an average of 2 ethylene oxide units/molecule. The raw latex was tripped under 750 mm. of mercury absolute pressure at 67 to 100° C. to produce a latex having 52 wt. percent total solids. When this latex was applied to paper at room temperature, and dried at 60° C. for about 1 hour, it was found to have good penetration properties, low film thickness, good heat sealing and excellent resistance to water vapor.

Example 2

A portion of the same copolymer described in the above example is dissolved in benzene together with a paraffin wax having a melting point of 60° C. to make a solution containing about 20 wt. percent of the copolymer-wax mixture. 1500 g. of the solution is dispersed in the same manner with the same aqueous solution employed above. The resulting raw latex is stripped under the same conditions and used to coat paper. This same procedure may be carried out using a microcrystalline wax, e.g. M.P. 75° C., in place of the paraffin wax. In either case the coating renders the paper more water repellent than if the paper had been coated with wax alone, and it can be folded without cracking and without losing its moisture-proof properties.

In the appended claims it is intended to claim all novelty inherent in the invention as well as all modifications coming within the scope and spirit of the invention.

What is claimed is:

1. A latex consisting essentially of about 100 parts by weight of an isobutylene-styrene copolymer having about 50% combined styrene and having a Staudinger molecular weight of about 60,000, about 1 to 20 parts by weight of the sodium salt of a sulfonated polyethylene oxide adduct of nonylphenol having an average of 2 ethylene oxide units/molecule, about 0.25 to 2 parts by weight of sodium dihydrogen orthophosphate, and the balance water to bring the total solids to about 52 wt. percent.

2. An article consisting essentially of a fibrous material having a coating between 0.5 and 20 mils thick composed of about 100 parts by weight of an isobutylene-styrene copolymer having about 50% combined styrene and having a Staudinger molecular weight of about 60,000, about 1 to 20 parts by weight of the sodium salt of a sulfonated polyethylene oxide adduct of nonylphenol having an average of 2 ethylene oxide units/molecule and about 0.25 to 2 parts by weight of sodium dihydrogen orthophosphate.

3. A latex consisting essentially of about 100 parts by weight of a copolymer of an isoolefin and a vinyl cyclic compound, about 1 to 20 parts by weight of an organic anionic sulfate having the formula:

$$R(OCH_2CH_2)_nOSO_3X$$

wherein R is selected from the group consisting of alkyl, aryl and aralkyl groups having about 12 to 16 carbon atoms, $n$ is 1 to 9 and X is selected from the group consisting of alkali metal, and ammonium, and about 0.25 to 2.0 parts by weight of a monovalent salt selected from the group consisting of alkali metal and ammonium salts of dihydrogen ortho-phosphates, with the balance being water to bring the total solids content to between about 20 and 70 weight percent.

4. A process for preparing a stable latex which consists of emulsifying about 100 parts by weight of a copolymer of an isoolefin and a vinyl cyclic compound, dissolved in an inert organic solvent with a composition consisting essentially of about 50 to 600 parts by weight of an aqueous solution containing about 1 to 20 parts by weight of an organic sulfate having the formula: $R(OCH_2CH_2)_nOSO_3X$ wherein R is selected from the group consisting of alkyl, aryl, and aralkyl groups having about 12 to 16 carbon atoms, $n$ is 1 to 9 and X is selected from the group consisting of alkali metal and ammonium, and between about 0.25 and 2.0 parts by weight of a monovalent salt selected from the group consisting of alkali metal and ammonium salts of dihydrogen ortho-phosphates, and stripping organic solvent from the resulting emulsion.

5. A process for coating a fibrous material which comprises applying to said fibrous material a coating of latex consisting essentially of about 100 parts by weight of a copolymer of an isoolefin and a vinyl cyclic compound, about 1 to 20 parts by weight of a salt of an organic sulfate having the formula: $R(OCH_2CH_2)_nOSO_3X$ wherein R is selected from the group consisting of alkyl, aryl, and aralkyl groups having about 12 to 16 carbon atoms, $n$ is 1 to 9 and X is selected from the group consisting of alkali metal and ammonium, about 0.25 to 2.0 parts by weight of a monovalent salt selected from the group consisting of alkali metal and ammonium salts of dihydrogen ortho-phosphates, and the balance being water to bring the total solids content to between about 20 and 70 weight percent, and drying the coated fibrous material formed.

6. An article of manufacture consisting of a fibrous material having a coating of between about 0.5 and 20.0 mils thick, said coating consisting essentially of about 100 parts by weight of a copolymer of an isoolefin and a vinyl cyclic compound, about 1 to 20 parts by weight of a salt of an organic sulfate having the formula:

$$R(OCH_2CH_2)_nOSO_3X$$

wherein R is selected from the group consisting of alkyl, aryl and aralkyl groups having about 12 to 16 carbon atoms, $n$ is 1 to 9 and X is selected from the group consisting of alkali metal and ammonium, and about 0.25 to 2.0 parts by weight of a monovalent salt selected from the group consisting of alkali metal and ammonium salts of dihydrogen ortho-phosphates.

7. A latex according to claim 3 in which there is between 5 and 50 parts by weight of an aliphatic hydrocarbon wax.

8. A latex according to claim 3 in which the isoolefin is isobutylene and the vinyl cyclic compound is styrene.

9. A latex according to claim 3 in which the orthophosphate is sodium dihydrogen orthophosphate.

10. A process according to claim 4 in which from about 5 to 50 parts by weight of an aliphatic hydrocarbon wax is also dissolved in the inert solvent.

11. A process according to claim 4 in which the organic sulfate has 4 to 9 ethylene oxide units.

12. A process according to claim 4 in which all of the organic solvent is stripped off.

13. A process according to claim 4 in which the inert solvent is a $C_6$ to $C_{12}$ liquid hydrocarbon.

14. A process according to claim 5 in which the latex contains between 5 and 50 parts by weight of an aliphatic hydrocarbon wax.

15. A process according to claim 5 in which the latex contains between about 5 to 50 parts by weight paraffin wax.

16. A process according to claim 5 in which the latex contains between about 5 to 50 parts by weight microcrystalline wax.

17. A process according to claim 5 in which the latex is applied by dipping the fibrous substance in it.

18. An article according to claim 6 in which the coating contains between 5 and 50 parts by weight of an aliphatic hydrocarbon wax.

References Cited in the file of this patent

UNITED STATES PATENTS

| 2,595,797 | Leyonmark et al. | May 6, 1952 |
| 2,606,178 | Kosmin | Aug. 5, 1952 |
| 2,662,064 | Mead | Dec. 8, 1953 |